(12) United States Patent
Remmlinger et al.

(10) Patent No.: US 6,666,430 B1
(45) Date of Patent: Dec. 23, 2003

(54) PROPORTIONAL VALVE

(75) Inventors: Hubert Remmlinger, Friedrichshafen (DE); Karlheinz Mayr, Wasserburg (DE); Wolfgang Runge, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 115 days.

(21) Appl. No.: 10/031,352

(22) PCT Filed: Jul. 15, 2000

(86) PCT No.: PCT/EP00/06778

§ 371 (c)(1),
(2), (4) Date: Jan. 17, 2002

(87) PCT Pub. No.: WO01/07810

PCT Pub. Date: Feb. 1, 2001

(30) Foreign Application Priority Data

Jul. 23, 1999 (DE) .......................................... 199 34 697

(51) Int. Cl.⁷ ................................................. B60T 13/66
(52) U.S. Cl. ............................ 251/129.15; 137/315.03; 137/454.2; 303/119.2
(58) Field of Search ................ 251/129.15; 137/315.03, 137/454.2; 335/278; 303/119.2

(56) References Cited

U.S. PATENT DOCUMENTS

| | | | |
|---|---|---|---|
| 4,647,008 A | | 3/1987 | Shirai et al. ............. 251/129.07 |
| 4,842,010 A | * | 6/1989 | Edgecomb et al. . 251/129.15 X |
| 4,951,703 A | * | 8/1990 | Brehm et al. .......... 137/315.03 |
| 5,156,184 A | * | 10/1992 | Kolchinsky .............. 137/454.4 |
| 5,280,873 A | * | 1/1994 | Abrahamsen et al. .. 251/129.15 |
| 5,374,114 A | * | 12/1994 | Burgdorf et al. ......... 303/119.2 |
| 5,704,585 A | * | 1/1998 | Hrytzak et al. ..... 251/129.15 X |
| 5,722,633 A | | 3/1998 | Goossens et al. ...... 251/129.15 |
| 5,762,318 A | | 6/1998 | Staib et al. ............. 251/129.15 |
| 5,823,507 A | | 10/1998 | Inden et al. ................. 251/129 |
| 5,845,672 A | * | 12/1998 | Reuter et al. .......... 137/315.03 |
| 6,065,496 A | | 5/2000 | Sanzenbacher et al. .. 251/129.1 |
| 6,170,516 B1 | * | 1/2001 | Sakata et al. ....... 251/129.15 X |
| 6,334,461 B1 | * | 1/2002 | Imai et al. .......... 251/129.15 X |
| 6,409,144 B1 | * | 6/2002 | Inami ..................... 251/129.15 |

FOREIGN PATENT DOCUMENTS

| | | | |
|---|---|---|---|
| BE | 62 77 57 | 1/1963 | |
| DE | 40 30 963 A1 | 4/1992 | ........... F16K/31/06 |
| DE | 44 12 664 A1 | 10/1995 | ........... F15B/13/08 |
| DE | 195 18 519 A1 | 11/1996 | ........... F16K/31/06 |
| DE | 196 07 773 A1 | 9/1997 | ........... F16B/13/044 |
| DE | 197 15 024 A1 | 10/1998 | ........... B60R/16/02 |
| DE | 197 51 240 A1 | 6/1999 | ........... F16K/31/02 |
| EP | 0 365 146 A2 | 4/1990 | ........... F16B/1/00 |
| EP | 0 538 986 A1 | 4/1993 | ........... F16K/31/06 |
| EP | 0 893 636 A1 | 1/1999 | ........... F16K/31/06 |

* cited by examiner

Primary Examiner—Gene Mancene
Assistant Examiner—Eric Keasel
(74) Attorney, Agent, or Firm—Davis & Bujold PLLC

(57) ABSTRACT

The invention relates to a proportional valve, especially for regulating the shifting pressure in an automatic transmission for a motor vehicle. The inventive valve is subdivided into a hydraulic section and into an electric section by a magnetic interface (XXXX). The bearing points (1, 2) of the hydraulic valve slide are arranged on the side of the valve opposite the electric coil, i.e. in the hydraulic section, so that the armature (5) projects into the coil space in a floating manner.

4 Claims, 3 Drawing Sheets

Detail Z

PROPORTIONAL VALVE

FIELD OF THE INVENTION

The present invention concerns a proportional valve, especially for the shifting pressure regulation in an automatic transmission for a motor vehicle.

BACKGROUND OF THE INVENTION

Proportional valves for the regulation of pressure are in manifold usage in automobile technology.

Pressure regulating valves, for example, are employed for the braking circuit for motor vehicles which are equipped with Anti-Blocking-System (ABS), as has been disclosed by DE 19715 024. In this cited patent, a shifting arrangement is described for the connection of current consuming equipment to an energy supply with emphasis given to a hydraulic pump and the electrically activated hydraulic valve of an ABS control arrangement for a motor vehicle. In this case, there is added, between the consuming equipment and the energy source, ON/OFF switching of the pump for individual activation of the hydraulic valve and for a total shutoff thereof.

Valves of the type used for the ABS-braking technology have been constructed also as digital valves, which have a magnetic interface available, so that a separation can be directly realized between the hydraulic and the electrical sections of the complete module in the digital valve. This entails the advantage, that with highly integrated modules, on the one hand separately testable units are made, and on the other hand by means of the high degree of integration, savings in cost become possible. This subdivision into hydraulic and electrical sections of a complete module has, up to this time, exclusively been adaptable for shift valve service, since, in this case, the manufacturing tolerances in the magnetic interface suffice to meet the requirements of the reproducibility of the magnetic flux.

SUMMARY OF THE INVENTION

The purpose of the present invention is to create a proportional valve, which, likewise, is divided by means of a magnetic interface into an electrical section and into a hydraulic section and in which the magnetic flux exhibits a high degree of reproducibility.

Starting from a proportional valve of the type described more closely in the introductory passages, the achievement of this purpose is accomplished by the features given in Claim 1. Advantageous embodiments are described in the subordinate claims.

Within the framework of the invention, provision has also been made, that the proportional valve, by means of a magnetic interface, is divided into a hydraulic section and an electrical section, whereby the bearing surfaces of the hydraulic valve spool are located on that end of the valve remote from the electrical coil, that is, the bearing surfaces are placed in the hydraulic section, so that the armature remains free in the coil space.

The magnetic interface is comprised of, first, a meandering line in the coil housing casing, which runs essentially perpendicular to the valve axis, second, a cross-slotting producing a spring action, and third, the said interface exhibits the shape of a slide fit with a lengthy transition taper.

Advantageously, the electrical section is provided with knife edge contacts and floats freely in a provided receiver with a bent shaped spring. The module possesses on its side which receives the electrical section a disk spring for transmitting externally imposed, axially directed forces against the magnetic interface.

With the invented design of a proportional valve, which is particularly well adapted for the shifting pressure regulation in automatic transmissions for motor vehicles, the advantage is achieved, that two separate, testable units have been made available, namely one being the electrical section and the other being the hydraulic section. The responsibility for a testable mechanical/electronic complete module can then be shifted to the suppliers. With the addition of further electrical functions, placement of this proportional valve is possible into the transfer plate furnished in the automatic transmission. A cost savings can be made by the omission of more specialized components. The integrated, compact construction design makes possible, in addition, an optimal use of installation space.

BRIEF DESCRIPTION OF THE DRAWINGS

The invention will now be described, by way of example, with reference to the accompanying drawings in which.

DETAILED DESCRIPTION OF THE INVENTION

Figure 1:
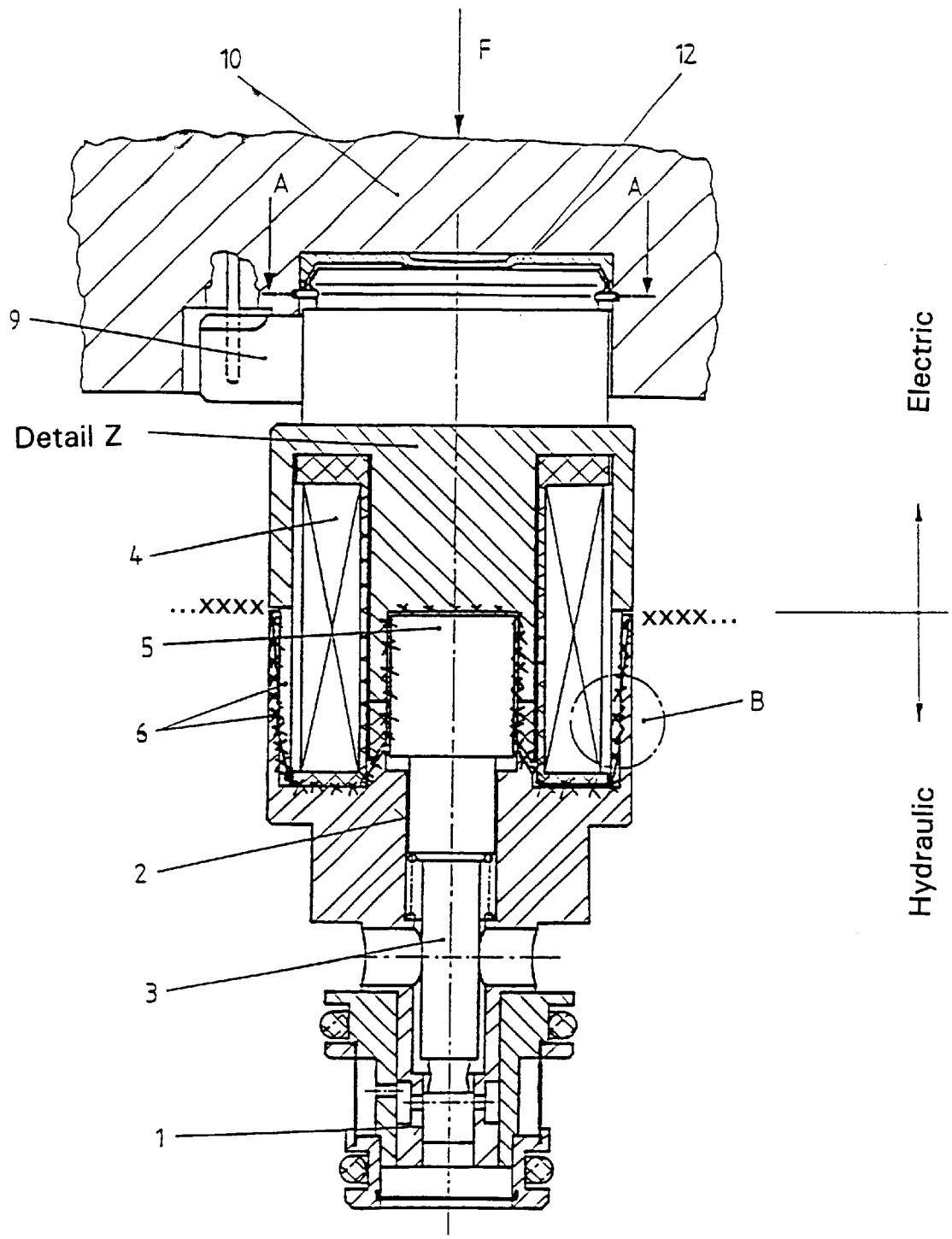
FIG. 1 a longitudinal section through a proportional valve constructed in accord with the invention, FIG. 2 a section through the detail in FIG. 1 designated with Z, FIG. 3 a plan view on this detail of FIG. 1 marked by Z, and FIG. 4 a section along the line A—A of FIG. 1.

FIG. 1 shows a section through the proportional valve of the invented design, the said valve having an electrical section designated by "electric" and a hydraulic section marked "hydraulic". In the case of the invented proportional valve these sections are provided to be separable from one another, but are shown in FIG. 1 in the assembled condition. In accord with the invention, in the case of this proportional valve, there is provided for the armature an unencumbered placement. That is to say, the bearing surfaces 1 and 2 of the hydraulic valve spool 3 are placed on that end of the proportional valve which is remote from the electrical section. The bearing surfaces 1, 2 are thus in the hydraulic section so that the armature 5 rests freely into the coil space.

Figure 2:
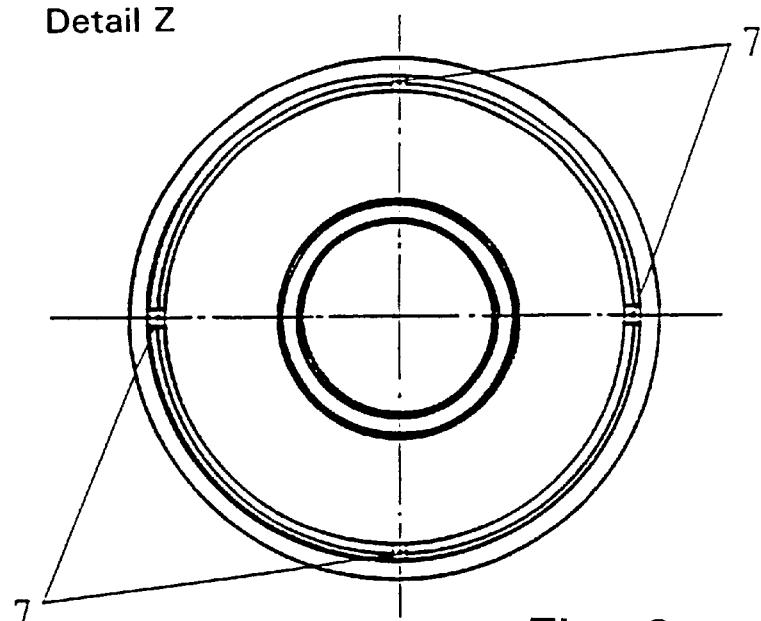
Figure 3:
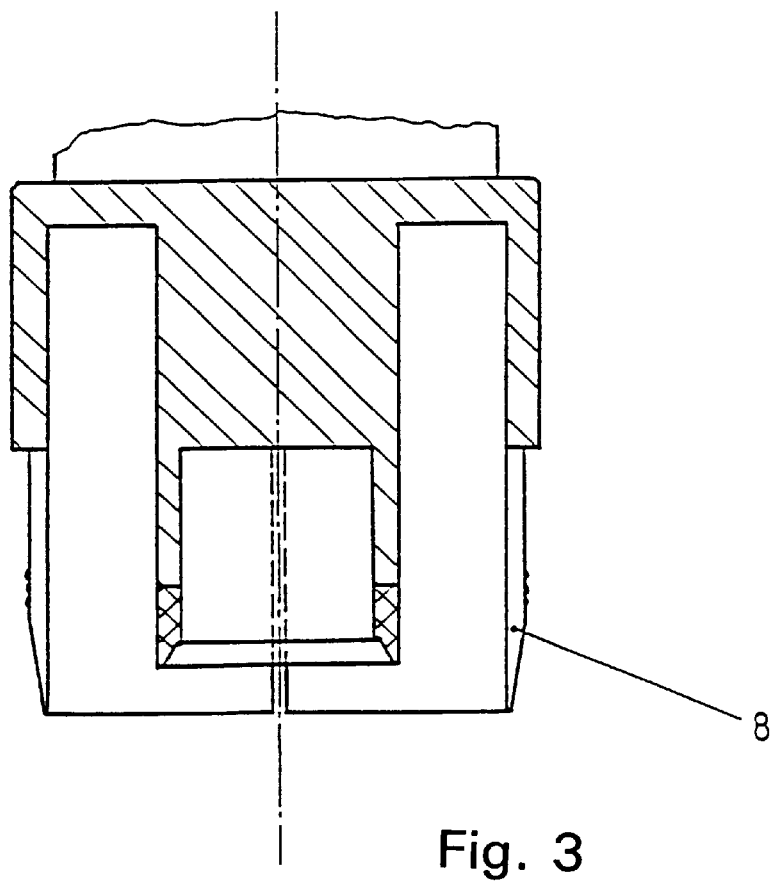

The actual magnetic interface B, which divides to the two sections, one from the other, is essentially formed in the coil housing casing 6 and by means of a cross slotting 7 (FIG. 2) is springlike constructed. That is, it is constructed as a sliding fit with a long transition taper 8 (FIG. 3). The magnetic interface B is indicated in FIG. 1 with a characterizing line marked . . . xxx . . . . This interface B does not divide the two sections from one another by one line running in one plane, but takes a meandering course shown in FIG. 1.

Figure 4:
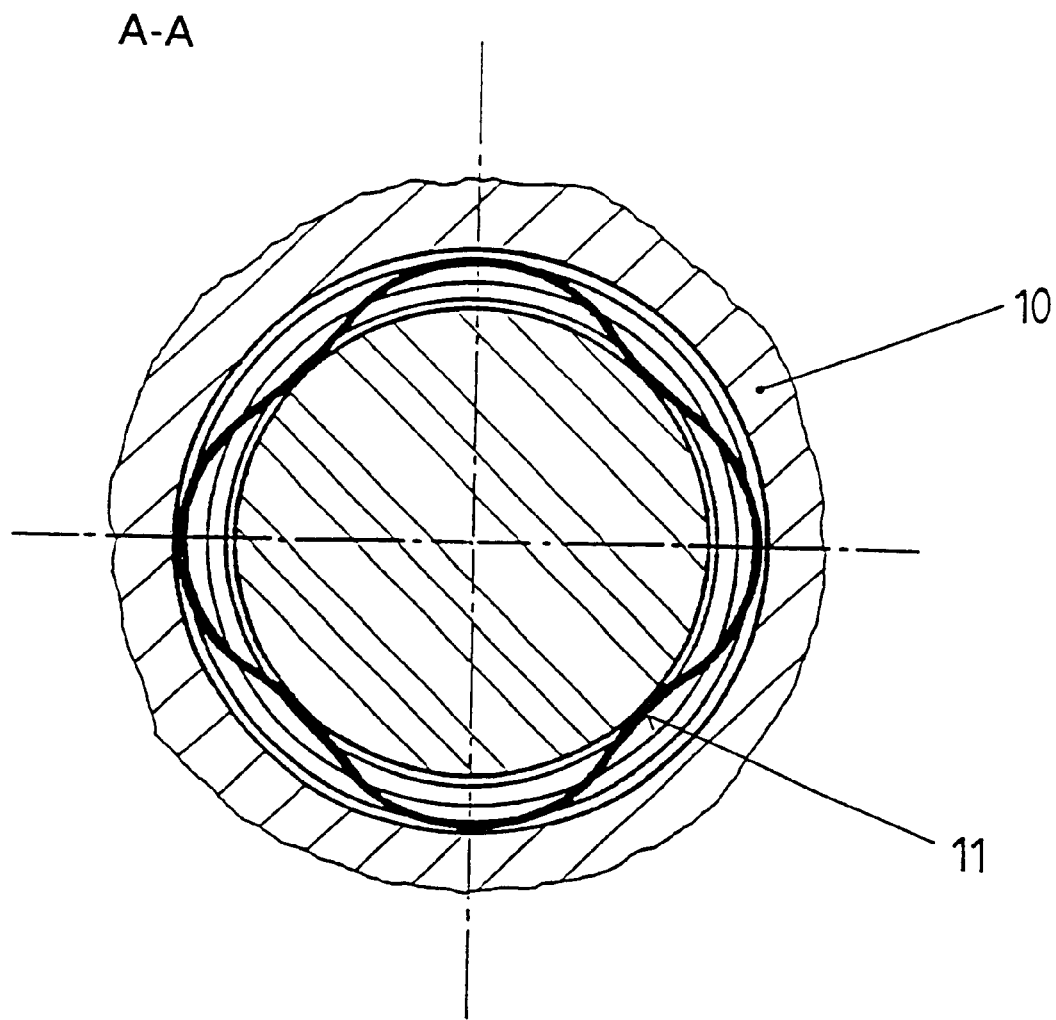

The electrical section exhibits, advantageously, a knife contact 9, which, for example, is floatingly carried in a module 10 which serves to accept the said electrical section by means of a bent shaped spring 11 (FIG. 4), so that manufacturing tolerances, especially axis misalignments, can be compensated for. On the module side, there is further an integrated disk spring 12 which transmits external superimposed, axial forces f onto the magnetic interface B.

Reference Numbers and Items

1 Bearing location
2 Bearing location

3 Hydraulic valve spool
4 Electrical coil
5 Armature
6 Housing casing
7 Cross slotting
8 Taper, conical
9 Knife-edge contact
10 Module
11 Bent shape spring
12 Disk spring

What is claimed is:

1. A proportional valve, especially for the shifting pressure regulation in an automatic transmission for a motor vehicle, with an electrical coil for generating a magnetic field and with an armature, which is slidable in a space housing said coil and which is axially connected to a hydraulic valve spool, wherein the proportional valve possesses an interface (B) designed with a springlike cross slot (7) and has the shape of a sliding fit seat with a lengthy transition cone (8), the interface (B) divides the valve into a hydraulic section and an electrical section, wherein the bearing locations (1, 2) of the hydraulic valve spool (3) are found on that end of the valve remote from the electrical coil, that is found in a hydraulic section, so that the armature (5) rests unencumbered in the coil space.

2. The proportional valve according to claim 1, wherein the interface (B) comprises space in the coil housing casing (6) running essentially perpendicular to the longitudinal valve axis.

3. The proportional valve according to claim 1, wherein the electrical section possesses knife blade contacts (9) and is freely floating in a module (10) which is provided with a centering spring (11).

4. The proportional valve according to claim 1, wherein the module (10), receiving the electrical section is provided with a disk spring (12) for the transmission of externally imposed connection forces (F) onto the interface(B).

* * * * *